United States Patent
Roberts et al.

(10) Patent No.: US 7,894,721 B2
(45) Date of Patent: Feb. 22, 2011

(54) CONTROL OF PARAMETERS IN A GLOBAL OPTICAL CONTROLLER

(75) Inventors: Kim B. Roberts, Nepean (CA); Genzao G. Zhang, Ottawa (CA); James Harley, Nepean (CA); Feng Shi, Ottawa (CA); Leo Strawczynski, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 11/533,166

(22) Filed: Sep. 19, 2006

(65) Prior Publication Data

US 2007/0014571 A1 Jan. 18, 2007

Related U.S. Application Data

(62) Division of application No. 09/956,557, filed on Sep. 20, 2001.

(60) Provisional application No. 60/300,837, filed on Jun. 27, 2001.

(51) Int. Cl.
*H04B 10/08* (2006.01)
*H04B 17/00* (2006.01)

(52) U.S. Cl. ......................................... 398/38

(58) Field of Classification Search ............... 398/38
See application file for complete search history.

(56) References Cited

U.S. PATENT DOCUMENTS

| 6,040,933 | A | 3/2000 | Khaleghi et al. |
|---|---|---|---|
| 6,392,769 | B1 | 5/2002 | Ford et al. |
| 6,433,904 | B1 | 8/2002 | Swanson et al. |
| 6,445,471 | B1 | 9/2002 | Shimokawa et al. |
| 6,466,348 | B1 | 10/2002 | Izumi |
| 6,545,799 | B1 | 4/2003 | McNamara |
| 6,583,903 | B1 | 6/2003 | Way et al. |
| 6,728,484 | B1 * | 4/2004 | Ghani .......................... 398/42 |
| 6,741,811 | B2 | 5/2004 | Nishi et al. |
| 6,742,154 | B1 | 5/2004 | Barnard |
| 6,810,214 | B2 | 10/2004 | Chbat et al. |
| 6,847,788 | B2 * | 1/2005 | Nakajima et al. ........... 398/149 |
| 6,871,020 | B1 * | 3/2005 | Boroditsky et al. ........... 398/38 |

(Continued)

FOREIGN PATENT DOCUMENTS

EP 0910182 A 4/1999

(Continued)

OTHER PUBLICATIONS

R. C. White, Jr., "A Survey of Random Methods for Parameter Optimization", Simulation vol. 17, No. 5, 1971.*

(Continued)

*Primary Examiner*—Shi K Li
(74) *Attorney, Agent, or Firm*—Kent Daniels; Blake, Cassels & Graydon LLP

(57) ABSTRACT

An optical network system having a global controller capable of controlling all the elements of the network. The controller receives performance data from each optical network element and calculates a performance value for each channel transmitting through the system. The controller then isolates the channel with the minimum performance value and tests possible changes in network element parameters to find a change which would increase this performance value. Once such a change is found, it is implemented and the system is reoptimized.

13 Claims, 6 Drawing Sheets

U.S. PATENT DOCUMENTS

| | | | |
|---|---|---|---|
| 6,885,820 | B2 | 4/2005 | Eder et al. |
| 7,095,956 | B2* | 8/2006 | Levandovsky et al. ........ 398/27 |
| 7,254,339 | B2* | 8/2007 | Cook et al. ................... 398/94 |
| 7,483,639 | B2* | 1/2009 | Hoshida et al. ............. 398/180 |
| 2003/0016410 | A1* | 1/2003 | Zhou et al. .................. 359/110 |
| 2003/0026297 | A1* | 2/2003 | Nagarajan et al. ........... 370/535 |

FOREIGN PATENT DOCUMENTS

WO      WO 0065760 A     2/2000

OTHER PUBLICATIONS

Jourdan et al., "Key Building Blocks for High Capacity WDM Photonic Transport Networks", IEEE Journal on Selected Areas in Communications, IEEE Inc., New York, US, vol. 16, No. 7, Sep. 1, 1998, pp. 1286-1297, XP000785945.

Audoln et al., "Demonstration of TMN Management of a WDM Network Testbed", Optical Fiber Communication Conference, Technical Digest Postconference Edition, Trends in Optics and Photonics, vol. 37, (IEEE Cat.No. 00CH37079), Technical Digest Postconference Edition Mar. 7-10, 2000, pp. 145-147, vol. 4 (XP001106787, Washington, DC, USA, Opt. Soc. America, ISBN 1-55752-630-3.

Habel et al., "Optical Domain Performance Monitoring", Optical Fiber Communication Conference (OFC), Technical Digest Postconference Edition, Baltimore, MD, Mar. 7-10, 2000, New York, US, vol. 2 of 4, pp. 174-174 XP 001061764.

"Optimization Theory with Application", by D. Pierre, Dover, 1986, pp. 264-265, 322 and 414-417.

"Operations Research", by H. Taha, Macmillan, 1976, pp. 2, 555-557 and 566-568.

Office Action from U.S. Appl. No. 09/956,557 dated Jul. 15, 2008.

* cited by examiner

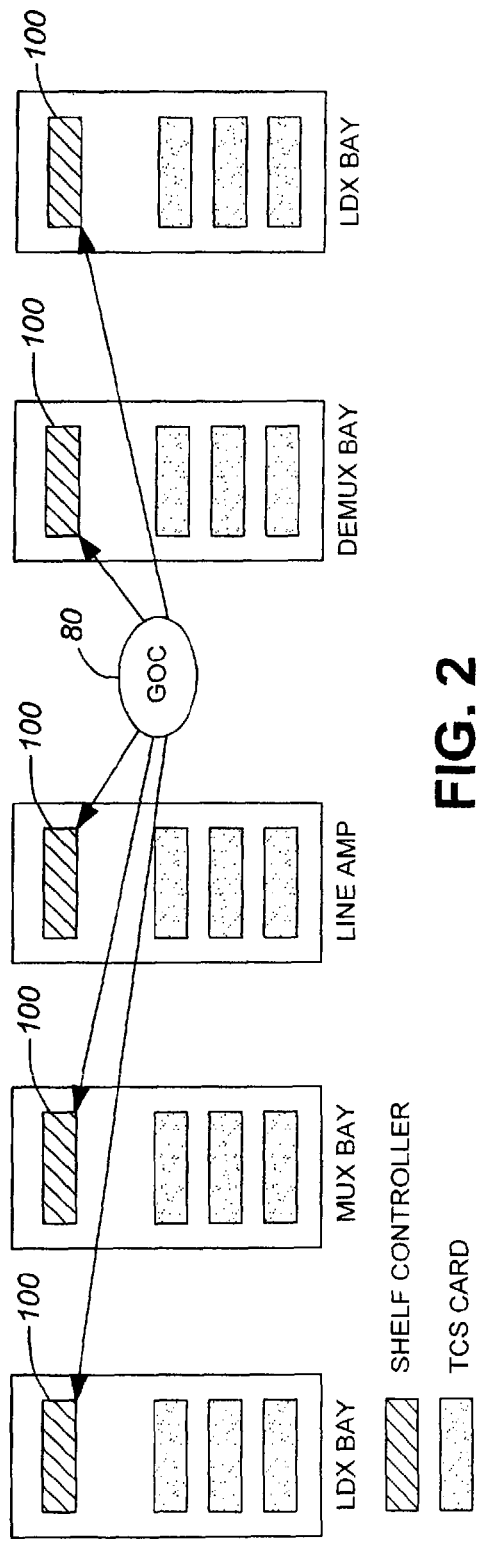
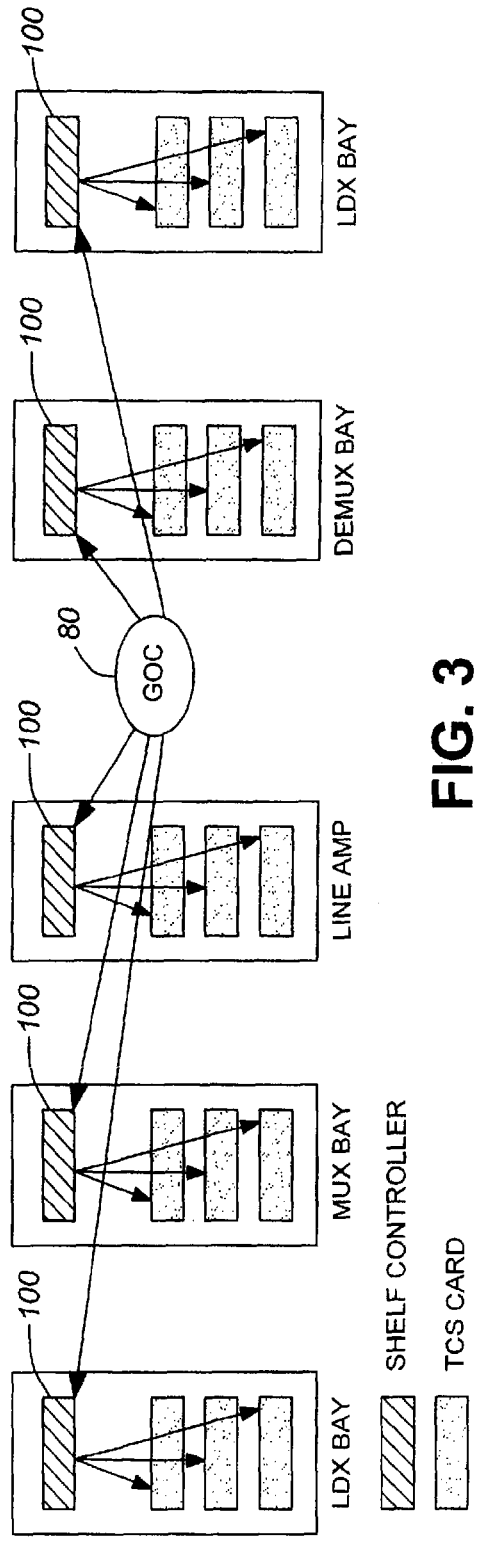
FIG. 2
FIG. 3

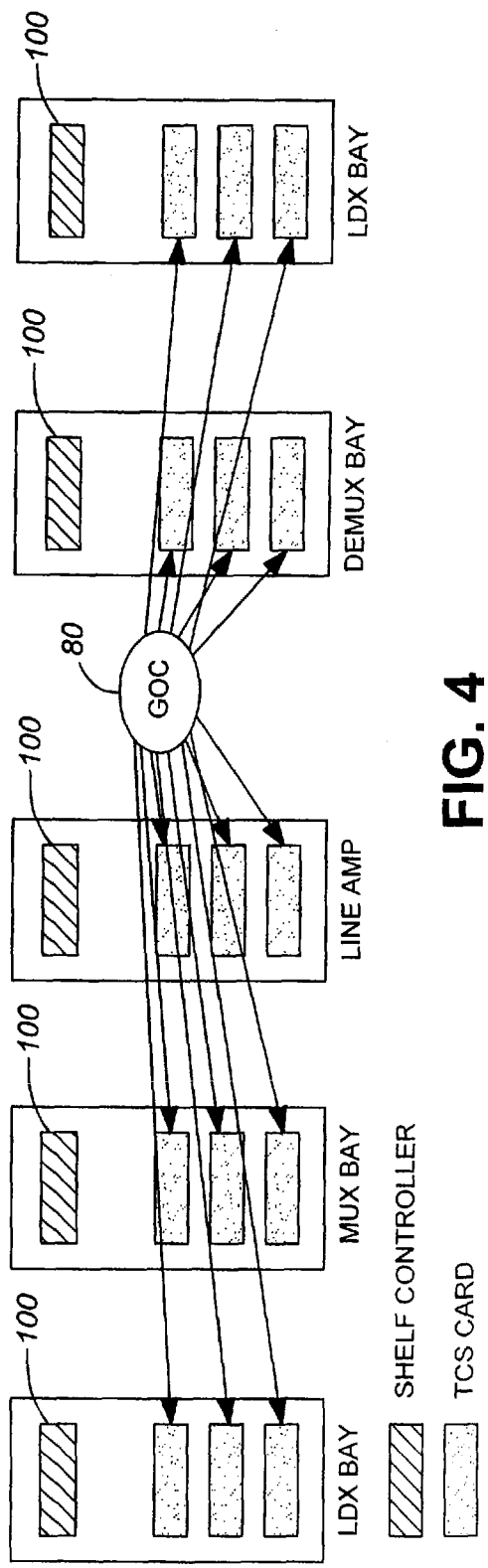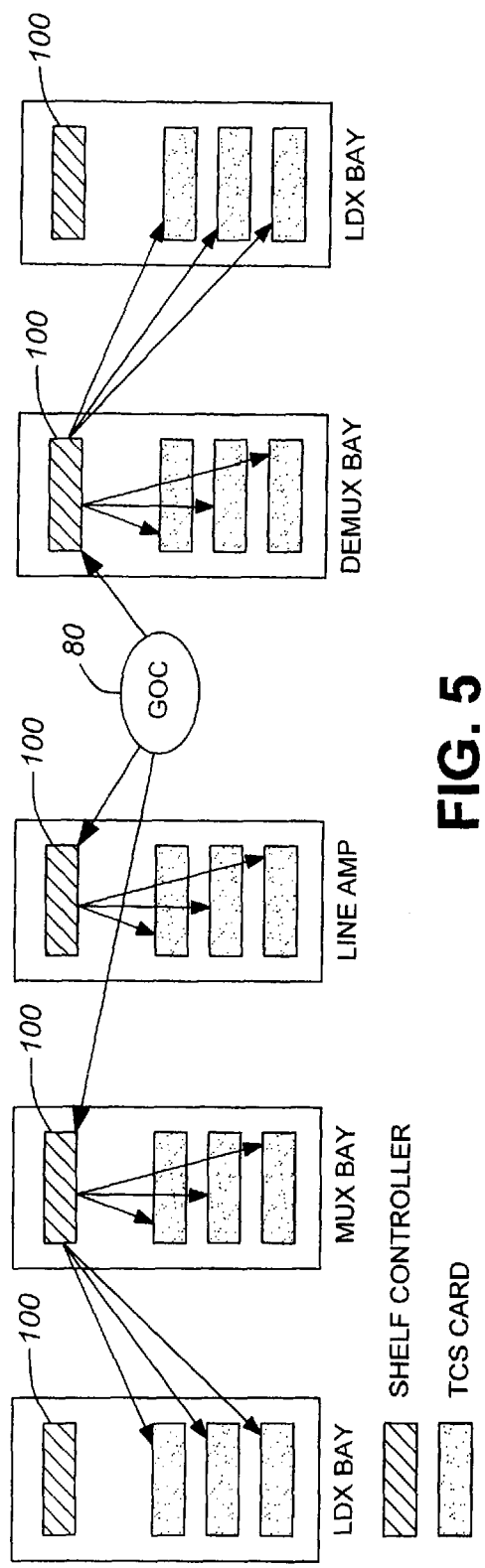

CONTROL OF PARAMETERS IN A GLOBAL OPTICAL CONTROLLER

RELATED APPLICATIONS

This application is a divisional of U.S. Ser. No. 09/956,557, filed on Sep. 20, 2001, which itself claims priority from U.S. Provisional Application No. 60/300,837 filed Jun. 27, 2001, both of which are hereby incorporated by reference.

FIELD OF THE INVENTION

The present invention relates to optical networks and, more specifically to optical networks controlled by a single controller.

BACKGROUND TO THE INVENTION

The future of telecommunications is in optical networks. Optical channels, especially with DWDM (dense wavelength division multiplexing), can carry more data, be less error prone, and in the long run be cheaper than existing copper wire transmission links. For long haul networks, such as transoceanic links, the optimum performance of the network would not only be advantageous but be more profitable to the network operator as well. However, the optimisation of such networks is, to say the least, difficult. Generally, such networks are optimised and then installed in environments that render servicing such networks if not impossible, then inconvenient. These environments, such as the floor of the Atlantic Ocean, therefore require a self-regulating and self-optimising network. Not only that, but such constraints would require that adding or subtracting channel capacity, when required, must be relatively easier than laying down a new network.

Furthermore, the aging of optical elements in the network will degrade the performance of the network. Changes in the environment where the network is installed may, from time to time, also affect network performance. All of these and other factors contribute to the eventual loss of effectiveness of the initial system optimization. It should also be noted that, after the initial system installation, the addition or deletion of transmission capacity may be desired.

A further difficulty to optimising such a network, apart from the physical impediments involved in accessing equipment underneath the ocean, is the need to manage and optimise hundreds of different parameters involved. Each piece of equipment in the network affects the signals routed through it and each parameter for that piece of equipment affects signals differently.

Based on the above, there is therefore a need for an optical network system which would be suitable for long haul installations. Ideally, the system should be self optimizing and be able to manage, optimise, and control the different parts of the network. Furthermore, such a system should be upgradable in that extra channel capacity can be added with relative ease.

SUMMARY OF THE INVENTION

The present invention meets the above need by providing an optical network system having a global controller capable of controlling all the elements of the network. The controller receives performance data from each optical network element and calculates a performance value for each channel transmitting through the system. The controller then isolates the channel with the minimum performance value and tests possible changes in network element parameters to find a change which would increase this performance value. Once such a change is found, it is implemented and the system is reoptimized.

In a first aspect, the present invention provides an optical transmission system for transmitting a plurality of optical signals, said system comprising:
- a plurality of transmitter modules each producing at least one optical signal;
- a multiplexer module for multiplexing said plurality of optical signals on to a single optical transmitting medium, said multiplexer receiving said plurality of optical signals from said transmitter modules;
- a plurality of receiver modules each receiver module receiving at least one optical signal;
- a plurality of optical network elements, said elements being positioned between said multiplexer module and at least one of said receiver modules; and
- a global controller module for controlling performance characteristics and functions of system elements chosen from the group comprising:
  said transmitter modules;
  said multiplexer modules;
  said receiver modules; and
  said optical network elements wherein
  said global controller module receives data from at least one of said system elements; and
  said global controller continuously optimizes said system by changing said characteristics and functions of said system elements based on said data.

In a second aspect, the present invention provides an optical transmission system for transmitting at least one optical signal from a transmitting end to a receiving end, said system comprising:
- at least one transmitter module at the transmitting end, said at least one transmitter module transmitting said at least one optical signal;
- at least one receiver module at the receiving end, said at least one receiver module receiving said at least one optical signal;
- a plurality of optical network elements between said at least one transmitter module and said at least one receiver module, at least one of said elements being a receiving element receiving said at least one optical signal from said at least one transmitter module, at least one of said elements being a transmitting element transmitting said at least one optical signal to said at least one receiver module; and
- a controller module controlling said plurality of optical network elements wherein said controller receives data from said optical network elements and optimizes the performance of said transmission system by continuously modifying performance characteristics of said network elements based on said data.

In a third aspect, the present invention provides a method of optimizing the performance of an optical transmission system having a global controller controlling a plurality of optical network elements, said method comprising;
a) gathering performance data from at least two said optical network elements;
b) calculating a system performance value based on said performance data of multiple optical signals;
c) momentarily changing multiple parameters of said system;

d) in the event a specific momentary change increases said system performance value, implementing a corresponding specific change in said parameters; and e) repeating steps a)-d) after implementing a change in said parameters.

In a fourth aspect, the present invention provides a method of optimizing an optical communications system having multiple components and multiple controllable parameters, the method comprising:

a) choosing at least one of the multiple parameters to test based on a history of results of previous tests;

b) temporarily changing the chosen at least one parameter by a first predetermined amount;

c) determining an effect of the change of step b) on the performance of the system;

d) determining which action is to be taken relative to the chosen at least one parameter based on the history of results of previous tests, the action being chosen from a group comprising:

increasing the chosen at least one parameter;

decreasing the chosen at least one parameter; and leaving the chosen at least one parameter at its current setting In a fifth aspect, the present invention provides a method of optimizing an optical communications system having multiple components and multiple controllable parameters, said controllable parameters affecting at least one transmission channel in said communications system, the method comprising:

a) temporarily increasing a controllable test parameter by a first predetermined amount from a base setting, said test parameter being one of said controllable parameters;

b) determining an effect of the increase of step a) on the performance of the system;

c) temporarily decreasing the controllable test parameter by a second predetermined amount from the base setting;

d) determining an effect of the decrease of step c) on the performance of the system;

e) determining if said test parameter is to be increased or decreased based at least on said effects determined in steps b) and d);

f) implementing an increase or a decrease in said test parameter based on results of step e); and g) repeating steps a)-f) using the increased or decreased test parameter as a new base.

In a sixth aspect, the present invention provides an optimization system for optimizing an optical communications system, said communications system having multiple components and multiple controllable parameters, the optimization system comprising:

means for temporarily increasing at least one of said controllable parameters from a base setting;

means for temporarily decreasing at least one of said controllable parameters from a base setting;

means for determining if an increase or a decrease in said at least one of said controllable parameters improves a performance measurement of said communications system; and means for implementing an increase or a decrease in said at least one of said controllable parameters such that said at least one of said controllable parameters is changed to form a new base setting.

In a seventh aspect the present invention provides, an article of manufacture comprising:

a computer readable and executable code, said code comprising computer instructions for optimizing an optical communications system having multiple components and multiple controllable parameters, said controllable parameters affecting at least one transmission channel in said communications system, the instructions comprising:

a) temporarily increasing a controllable test parameter by a first predetermined amount from a base setting, said test parameter being one of said controllable parameters;

b) determining an effect of the increase of step a) on the performance of the system;

c) temporarily decreasing the controllable test parameter by a second predetermined amount from the base setting;

d) determining an effect of the decrease of step c) on the performance of the system;

e) determining if said test parameter is to be increased or decreased based at least on said effects determined in steps b) and d);

f) implementing an increase or a decrease in said test parameter based on results of step e); and g) repeating steps a)-f) using the increased or decreased test parameter as a new base.

In an eighth aspect, the present invention provides a method of activating additional transmission capacity in an optical communications system, said additional capacity comprising at least one incoming optical channel, said method comprising:

a) determining if operating conditions in said communications system are conducive to an addition of an incoming optical channel;

b) if operating conditions are conducive to a channel addition, increasing a power level of said incoming channel; and c) increasing a contribution of said incoming channel to an overall system performance measurement.

In a ninth aspect, the present invention provides an article of manufacture comprising:

computer readable media containing computer readable and executable code comprising instructions for a method of activating additional transmission capacity in a optical communications system, said additional capacity comprising at least one incoming optical channel, said method comprising:

a) determining if operating conditions in said communications system are conducive to an addition of an incoming optical channel;

b) if operating conditions are conducive to a channel addition, increasing a power level of said incoming channel;

c) a contribution of said incoming channel to an overall system performance measurement.

In a tenth aspect, the present invention provides a method of deactivating transmission capacity in an optical communications system, said transmission capacity comprising at least one optical channel, said method comprising:

a) determining if operating conditions are conducive to a deactivation of an optical channel;

b) if conditions are conducive to a deactivation of an optical channel, decreasing a contribution of an outgoing channel to an overall system performance measurement; and c) decreasing a power level of said outgoing channel.

In an eleventh aspect, the present invention provides an article of manufacture comprising:

computer readable media containing computer readable and executable code comprising instructions for deactivating transmission capacity in an optical communications system, said transmission capacity comprising at least one optical channel, said instructions comprising:

a) determining if operating conditions are conducive to a deactivation of an optical channel;
b) if conditions are conducive to a deactivation of an optical channel, decreasing a contribution of an outgoing channel to an overall system performance measurement; and
c) decreasing a power level of said outgoing channel.

In a twelfth aspect, the present invention provides a method of activating additional transmission capacity in an optical communications system, said additional capacity comprising at least one incoming optical channel, said method comprising:

a) determining parameter settings for equipment said communications system for adding one incoming channel;
b) determining if operating conditions in said communications system are conducive to an addition of an incoming optical channel;
c) activating said incoming channel if operating conditions are conducive to a channel addition;
d) increasing a power level of said incoming channel; and
e) optimizing the communications system while said power level is being increased.

In a thirteenth aspect, the present invention provides a method of optimizing an optical communications system after adding additional transmission capacity, said method comprising:

a) increasing a contribution of an incoming channel to a overall system performance measurement;
b) experimenting with parameters of said system to increase said system performance measurement; and
c) repeating steps a)-b) until said incoming channel is a full component of said system performance measurement.

In a fourteenth aspect the present invention provides a method of assessing an overall performance of an optical communications system, said system having multiple parameters and multiple channels, the method comprising:

a) gathering performance data for said multiple channels;
b) calculating a cost function based on said performance data; and
c) determining if said cost function exceeds a predetermined threshold.

In a fifteenth aspect the present invention provides a method of increasing performance of an optical communications network having multiple channels and multiple adjustable parameters, the method comprising:

a) gathering performance data measurements for a plurality of said multiple channels;
b) determining an overall performance measurement for said system based on said performance data measurements; and
c) adjusting selected adjustable parameters to improve said overall performance measurement for said system.

In a sixteenth aspect the present invention provides a method of deactivating transmission capacity in an optical communications systems, said transmission capacity comprising at least one outgoing optical channel, said method comprising:

a) determining if operating conditions are conducive to a deactivation of an optical channel;
b) if conditions are conducive to a deactivation of an optical channel, decreasing a power level of said outgoing channel; and
c) optimizing said communication system.

In a seventeenth aspect the present invention provides a method of deactivating transmission capacity in an optical communications systems, said transmission capacity comprising at least one outgoing optical channel, said method comprising:

a) determining if operating conditions are conducive to a deactivation of an optical channel;
b) if conditions are conducive to a deactivation of an optical channel, decreasing a contribution of an outgoing channel to an overall system performance measurement;
c) of optimizing said communication system.

DETAILED DESCRIPTION OF THE DRAWINGS

A better understanding of the invention may be obtained by reading the detailed description of the invention below, in conjunction with the following drawings, in which:

FIG. 2 is a block diagram of a possible control scheme for the optical network of FIG. 1;

FIG. 3 is a block diagram of an alternative control scheme for the optical network of FIG. 1;

FIG. 4 is a block diagram of yet another control scheme for the network of FIG. 1 which increases the level of control that the global controller has over the network elements;

FIG. 5 is block diagram of a further control scheme for the network of FIG. 1 that is a hybrid of the other control schemes illustrated previously;

DETAILED DESCRIPTION

Figure 1:
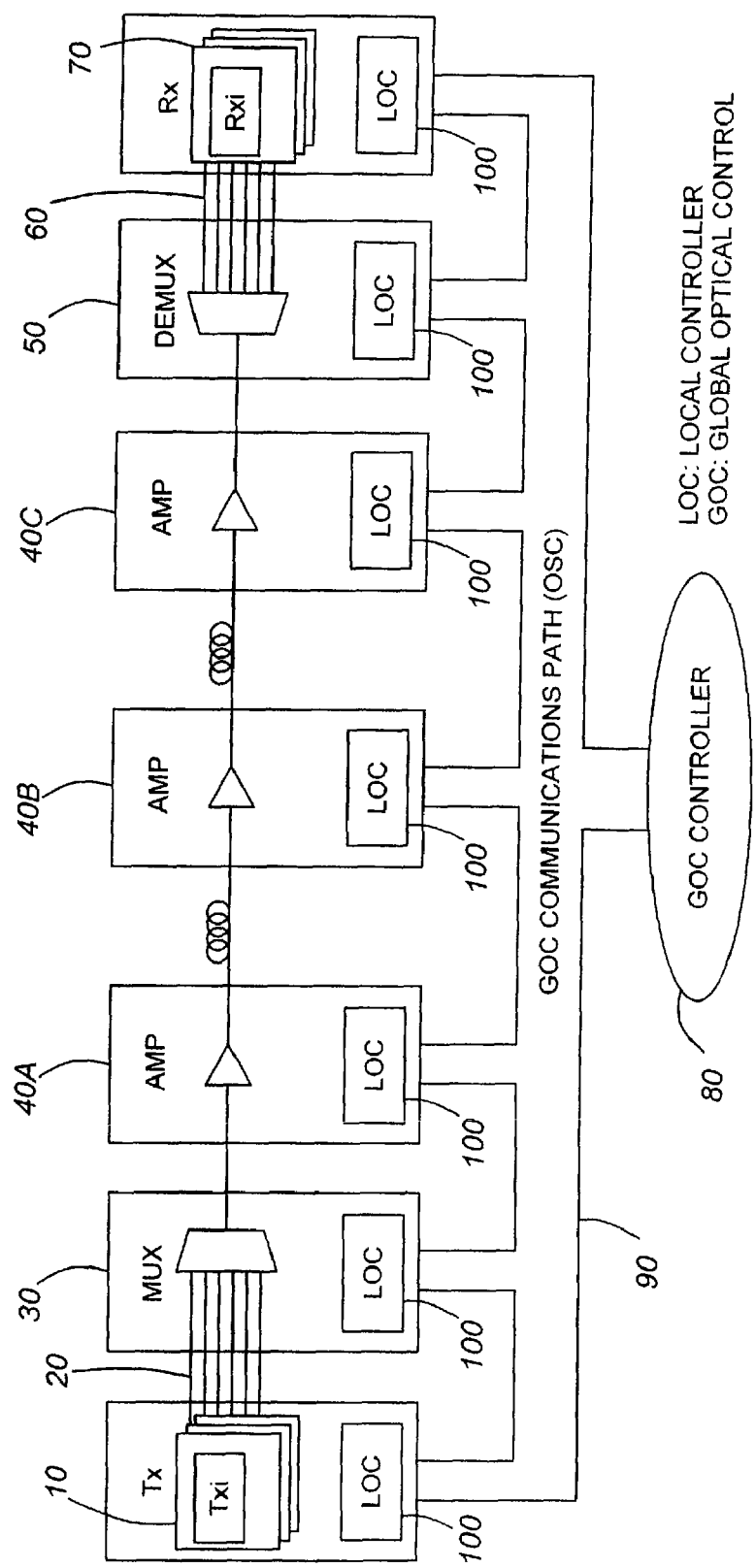
FIG. 1 is a block diagram of an optical network.

Referring to FIG. 1, a block diagram of an optical network according to the invention is illustrated. A number of transmitter modules 10 transmit multiple channels 20 to an optical multiplexer module 30. The multiplexer multiplexes the channels 20 on to a single optical transmission medium (normally an optical fiber) which is fed to an optical amplifier module 40A. For long haul installations, multiple optical amplifier modules 40B, 40C amplify the multiplexed signals before finally delivering them to an optical demultiplexer module 50. The demultiplexer 50 then demultiplexes the signals into multiple channels 60 for delivery to multiple receiver modules 70. A global optical controller 80 communicates to each of the network elements in the network through a communications path 90.

As can be seen, each of the network element modules has a local controller 100 which is able to control the network elements' operating characteristics. The global controller is able to communicate with the local controller 100 not only for data gathering but also for controlling each network element module.

To clarify the function of the network illustrated in FIG. 1, the global controller collects data relating to network performance from each of the element modules. The global controller then collates this data to arrive at a performance value for each of the multiple signals. The performance value is a number which indicates whether the signal is being transmitted properly and efficiently. The signal having the lowest performance value is then found and parameters which affect this performance value is determined. The controller carries out multiple predetermined experiments which affect this lowest performance value. The experiments are in the form of changing specific parameters by predetermined amounts. The effect of this experiment on the performance value is then logged and used to determine which experiment yielded the best results in terms of increasing this lowest performance value. Once the most successful experiment is found, the measures taken for that experiment are then applied and the optimisation is begun anew, hopefully with a new signal having a new lowest performance value.

The optimisation executed by the global controller is a well-known problem in the field of optimization. The search for parameters which maximize a minimum value is known as the minimax problem and analytical methods exist to assist in finding such a solution. However, given the nature of such problems and their erstwhile solutions, it is possible that a number of "solutions" may arise among which the controller may get trapped. To avoid such a possibility, providing weights to specific parameters in the equations, with the weights decaying per experiment, gives an element of randomness which should avoid such solutions. A more detailed discussion and explanation of such an optimisation scheme is set later in this document.

Another possible optimization scheme is to use cost functions. These cost functions measure the overall performance of the system and are based on measurements of performance of the system elements or of the system channels. To optimize using cost functions, trade-offs may be made between different components or elements. By reducing the performance of one element, an increased by cost function, may be obtained. On, by reducing a specific parameter, one element may be detrimentally affected while another may be advantageous affected to result in an improvement in overall performance. This optimization scheme is also explained and discussed in detail below.

Returning to FIG. 1, it should be noted that, while the network elements illustrated are only optical amplifiers, other elements such as optical cross-connects, optical filters, diffusion (dispersion) compensation modules, add/drop multiplexers, lasers, pulse generators, modulators, polarization and delay devices, Raman amplifiers, and gain flattening filter can be used as well.

Control Scheme

As noted above, the global controller receives data from the network element modules and also controls these same modules. The global controller accesses data by querying each module and receives data in return. For control, the global controller sends a control message to the relevant network element module setting the modules parameters. Once the module receives this message, it sets the proper parameters and sends an acknowledgement back to the global controller.

Referring to FIG. 2, a possible control scheme is illustrated in a block diagram. The global controller 80 communicates with local controller 100. Each local controller 100 directly controls multiple network element modules. This scheme therefore envisions that global controller messages and queries are to be passed, interpreted, and implemented by each local controller 100 for the network element modules under its control. With this scheme, the global controller cannot directly access a network element without direct intervention from the local controller.

Referring to FIG. 3, another control scheme is illustrated. In this scheme, the global controller's messages and queries are passed directly to each network element. The global controller thus can send control messages directly to a network element. The element can then implement or respond to the message accordingly. Each message or query is sent to the local controller by the global controller. The message or query is then re-routed to the relevant network element. The local controller thus acts simply as a redirection agent for each element module.

The control scheme is FIG. 4, on the other hand, further increases the level of control that the global controller has over the network elements. In FIG. 4, the global controller sends messages directly to the network element without any intervention from the local controller. The network elements then receive the messages and implement or respond to them accordingly.

The control scheme of FIG. 5 is a hybrid of the other control schemes discussed. The global controller sends messages only to certain local controllers and these messages are re-routed to the network element. The local controllers, which receive messages directly, may redirect global messages to network elements in other modules. While seemingly counterintuitive, the scheme does reduce the amount of connection to the global controller. With this scheme, the messages are received by the network element and are directly implemented or responded to.

While the schemes presented above offer different options with regard to the number of connections and the level of control for the global controller, any of the above can be used for the network.

It should be noted that, to assist in the control scheme, each network element would have its own unique address in the network. With this, the global controller can send messages to a network element by merely using that element's unique address. Depending on the control scheme used, the address resolution may be implemented and carried out by the local controller or address resolution may not even by needed (see discussion above for control scheme in FIG. 4).

To further facilitate understanding of the control mechanism for the network elements, the control messages emanating from the global controller to the network element may have the form of a request message. The request message requests something of the network element, whether data or that an action be performed by the network element. Such a request message would have the following fields:

Message number;
Source address;
Destination address;
Action requested; and
Parameters of action requested.

The action requested by the global controller can be one of two actions: set a parameter to a desired target or measure a desired parameter. For the set command, the following fields are required to properly set the parameter:

Parameter: the identity of the parameter to be set;
Target: the desired target value for the parameter to be set;
Timeout duration: the allotted time to set the parameter to the target value.

For a measurement message, the global controller is requesting that the network element measure a certain parameter. The measurement message thus can have the following fields:

Parameter: the identity of the parameter to be measured; and
Duration: the duration of the measurement if applicable.

In response to a message from the global controller, the network element sends a response message back to the global controller. The response message would have the following fields:

Message Number;
Destination Address;
Source Address;
Result of Request;

Result Field;
Reason.

The result field would have subfields that indicate the results of the request. Thus, if the request was a set request, the fields of the results could be the following fields:

Parameter: Identity of the parameter which the global controller requested to be set;
Achieved Target: The actual setting of the parameter. This can be requested setting or a setting approximating the requested setting.

If on the other hand, the network element timed out, then the result will be a null—the request was not achieved. Under the reason field of the response message, the reason for not achieving the request would be entered. The reason can be a timeout, element equipment fault, an improper request, or element equipment not available (unknown destination address).

If the global controller had requested a measurement to be taken (request for data), then the response message would have the following fields for the results field:

Parameter: identity of the parameter measured;
Measured Value: the value of the requested parameter;
Duration of Measurement: time duration of the measurement (if applicable or if requested by the global controller).

Again, if the measurement could not be accomplished, then the result field be a null. Under the reason field the cause of the non measurement can be explained.

While the above control scheme can be used to test the system for the effects of changing specific parameters, this method can be quite tedious. In this scheme, the global controller would choose at least one parameter to be tested. This parameter(s) is then set to a predetermined test value and then the effects of this setting are measured. The parameter(s) are then reset to their previous setting and a new test value is tested. Once all the test/measure/reset sequences are done for the test values, the global controller determines which test setting offers the best performance value based on the results. This chosen setting is then re-implemented and the testing begins anew using the new setting as the initial base setting.

To reduce the amount of traffic between the global controller and the network elements, an alternative would be to implement a perturb function in each element. This perturb function would allow each element to change at least one specific parameter by a certain amount for a specific amount of time and measure the changes resulting from the temporary change. Once the specific amount of time has passed, the parameter's setting is returned to its original value. The global controller thus provides the network element with values required for the perturbation to be implemented and the network element responds with a measured response. Thus, in addition to the set and measure commands, a perturb command can be added. Under the action requested field of the request message, the entry would be perturb. The parameters of the action required would be:

Parameters: the identity of the parameter to be perturbed;
Target: the target value to which the parameter is to be momentarily set to. As an alternative, this can be a step value or a value by which the parameter setting can be increased or decreased rather than a specific parameter setting;
Time for
Perturbation: the amount of time the parameter setting is to be held at the setting indicated by the target field; and
Duration: the duration of the measurement to be taken.

As noted above, when the perturb command is received by the network element, the parameter identified is set to the desired setting for the desired amount of time and the resulting effect on the performance value is measured for the set duration.

Optimization

To optimize the system described above, manual optimization can be used. However, the passage of time and changing operating conditions will eventually render this manual optimization useless. A continuous optimization method is therefore required to account for changing conditions and for wear and tear. Continuous optimization can allow for changing traffic conditions and changing system priorities. The continuous optimization optimizes by experimenting with the different parameters of the optical system. A cost function that takes into account all the performance measurements of each element in the system is used as the overall performance measurement. From a base setting, each chosen parameter is increased by a predetermined amount and the effects of this perturbation on the cost function is evaluated. Each chosen parameter is then returned to its base setting. These chosen parameters are then decreased by another predetermined amount and the effects of this new setting on the cost function are evaluated. Based on how the different costs function compare to one another, each chosen parameter is either increased, decreased, or kept at the same setting. This new base setting will thus now be the basis for another set of perturbation experiments.

It should be noted that the optimization process is continuous. This means that optimization is carried out on the system as long as the system operates. The optimization process can be carried out periodically, as in once every hour or once every few days. However, the optimization process can also be carried out consecutively in that after one optimization terminates another is automatically started.

The above method also employs multiple weighting factors which can be adjusted to lend more importance to different factors. Also, the cost function can be based on a number of different possible factors. In one implementation, the cost function is based on channel BER or bit error rate. However, this need not be the only basis. Channel noise, channel throughput, and other measurements can form the basis of the cost function. In addition to these alternatives, the history of previous decisions taken can also be used in deciding whether to increase a parameter, decrease a parameter or leave the parameter at its current setting.

In one implementation, the cost functions is defined as $$FC = \sum_{i=1}^{Nc} Wci(\Delta Q)^\alpha$$

where $$\Delta Q = \begin{cases} (Qth - Qi) & \text{if } Qi < Qth \\ 0, & \text{if } Qi \geq Qth \end{cases}$$

Nc=number of channels in the system
Wc=channel weighting coefficient vector $Wc = [Wc_1, Wc_2, \ldots Wc_{Wc}]$ Qth=Threshold value for Q, fixed as a predefined constant or as a variable to be adaptively adjusted during system optimization
Qi=Q value for channel i
α=power factor which may be adjusted to control the behaviour of the cost function and should be greater than zero.

In the above cost function the Q value is related to the BER (bit error rate) for a channel. However, Q need not be related to the BER. As long as Q is a measurement of a channel's signal quality where a lower Q is desirable, then the above cost function will be useful. Other cost functions are possible as long as these cost functions account for all the channels in the system and the final result of the cost function is a measurement of the performance of the whole system.

It should be kept in mind that the ultimate goal of the optimization is, as noted above, to maximize the minimal Q. The cost function given above does not take into consideration Q values that are above a certain threshold. Only Q values below Qth are used and these Q values are ones targeted for maximizing.

Once the cost function for the base setting is found, the optimization procedure must choose which parameters are to be experimented with, or targeted. This is done by calculating the sorting function for each parameter. A parameter's sorting function value will be an indication of that parameter's "importance" in adjusting the effectiveness of the optimization. These sorting function parameters are then ranked to determine which parameters are to targeted.

The sorting function for each function can be defined as:

$$Fc_i = |(FD+)_i - (FDo)_i| + |(FDo)_i - (FD-)_i|$$

for parameter i FD+, FDo, and FD− are decision functions based on a history of previous adjustment decisions and current tests based on stated experiment methods for that parameter. These decision functions will be described in more detail below.

Once each parameter's sorting function value is calculated, all of the sorting function values are ranked in descending order. These ranked sorting function values are then mapped on to a matrix with Ns rows and (N/Ns) columns for N parameters. From the resulting matrix, one can determine which parameters are to be targeted. Each row in the matrix is a sorting set and the first Nst columns from the left determine the targeted parameters, with Nst being a value between 1 and (N/Ns). Therefore, if the following are the sorting function values for the following parameters, $P_A$(FS)=0.2 $P_I$(FS)=0.45 $P_Q$(FS)=0.38
$P_B$(FS)=0.82 $P_J$(FS)=0.57 $P_R$(FS)=0.93
$P_C$(FS)=0.9 $P_K$(FS)=0.73 $P_S$(FS)=0.42
$P_D$(FS)=0.11 $P_L$(FS)=0.25 $P_T$(FS)=0.27
$P_E$(FS)=0.22 $P_M$(FS)=0.67
$P_F$(FS)=0.15 $P_N$(FS)=0.58
$P_G$(FS)=0.72 $P_O$(FS)=0.49
$P_H$(FS)=0.33 $P_P$(FS)=0.52 then a sorted list with the largest sorting function value in front will be:

$P_R$=0.93
$P_C$=0.9
$P_B$=0.82
$P_K$=0.73
$P_G$=0.72
$P_M$=0.67
$P_N$=0.58
$P_J$=0.57
$P_P$=0.52
$P_O$=0.49
$P_I$=0.45
$P_S$=0.42
$P_Q$=0.38
$P_H$=0.33
$P_T$=0.27
$P_L$=0.25
$P_E$=0.22
$P_A$=0.2
$P_F$=0.15
$P_D$=0.11

Clearly, the above is for a system with 20 different parameters. The above list can then be placed in a matrix of 5 rows, if 5 sets are desired, as such:

$$\begin{bmatrix} P_R & P_M & P_I & P_L \\ P_C & P_N & P_S & P_E \\ P_B & P_J & P_Q & P_A \\ P_K & P_P & P_H & P_F \\ P_G & P_O & P_T & P_D \end{bmatrix}$$

From this matrix, the first $N_{st}$ rows denote the targeted parameters. Thus, if $N_{st}$=1, then the targeted parameters are $P_R, P_C, P_B, P_K$, and $P_G$. These parameters will therefore be the parameters to be perturbed in the experiments. On the other hand, if $N_{st}$=2, then the first two rows denote the parameters to be experimented with.

By placing the sorting function values in a matrix, it is easier to determine which parameters are to be used in the experiments. As an example, if the number of parameters to be experimented with are to be in multiples of 5 (5 parameters, 10 parameters, or 15 parameters) then from the matrix above, this can easily be done. The optimization procedure need only choose one, two, or three columns to increase the number of targeted parameters.

Once the targeted parameters are chosen, each targeted parameter is, in turn, increased by a predetermined amount. As an example, if $N_{st}$=1 and using the matrix above, then the targeted parameter for the first set (the parameters in the first row) is $P_R$. The "un-sorting" parameters or the parameters in the same set as the targeted parameter(s) but which are not targeted, are each randomly set to a different setting. This random new setting is achieved by adding or subtracting a predetermined value to each of these untargeted parameters. A random new setting is also set for a number of the untargeted parameters from the other sets. Thus, from the above matrix, the following settings can be set, with the + symbol denoting an increase in the base setting and the − symbol denoting in the base setting and a o denoting no change:

| | | | |
|---|---|---|---|
| $P_R$+ | $P_M$− | $P_I$+ | $P_L$+ |
| $P_C$o | $P_N$− | $P_S$o | $P_E$o |
| $P_B$o | $P_J$+ | $P_Q$+ | $P_A$+ |
| $P_K$o | $P_P$− | $P_H$o | $P_F$o |
| $P_G$o | $P_O$− | $P_T$o | $P_D$+ |

As can be seen, only the first element in the first column (the targeted parameters) is given a change. Also, it should be noted that all the elements in the targeted set ($P_M$, $P_I$, $P_L$) are each randomly adjusted with either a decrease or an increase. Furthermore, parameters which are neither in the targeted set nor in one of the targeted parameters are randomly chosen and randomly adjusted with a decrease or an increase. If a parameter is not chosen, then no change is applied.

After the first experiment, a second similar experiment is executed. The procedure is the same except that the targeted parameter is decreased by another predetermined amount from the base setting. The settings for the other parameters are kept at the same settings as the first experiment. The settings are thus:

| | | | |
|---|---|---|---|
| $P_R^-$ | $P_M^-$ | $P_I^+$ | $P_L^+$ |
| $P_C^o$ | $P_N^-$ | $P_S^o$ | $P_E^o$ |
| $P_B^o$ | $P_J^+$ | $P_Q^+$ | $P_A^+$ |
| $P_K^o$ | $P_P^-$ | $P_H^o$ | $P_F^o$ |
| $P_G^o$ | $P_O^-$ | $P_T^o$ | $P_D^+$ |

With these new settings, the cost function is measured and calculated. The result is then stored and catalogued as being from the decrease experiment. It should be noted that the above procedure can also be used if the rows referred to above were columns and vice versa.

From the above, it should be clear that for each targeted parameter there are 2 experiments and, as a result, for each set of $N_{st}$ targeted parameters, there will be $2*N_{st}$ experiments and results. All of these results are stored and kept along with the previous results and decisions in previous experiments.

As a first step in deciding which direction to change a parameter, the cost function record for that parameter is reorganized into three subsets—a first subset for previous decisions that increased the parameter, a second subset for previous decisions that decreased the parameter, and a third subset for previous decisions that did not change the parameter. Each subset therefore becomes a decision record or a vector of cost function values detailing the final cost function value after each decision.

From each of the above vectors, a ratio is calculated. These ratios are:

$$FR+(P) = \frac{\sum_{j=1}^{N+}[Wdj(P)Wtj(P_i)FC_j(P)]}{\sum_{j=1}^{N+}[Wdj(P)Wtj(P)]}$$

$$FR-(P) = \frac{\sum_{j=1}^{N-}[Wdj(P)Wtj(P_i)FC_j(P)]}{\sum_{j=1}^{N-}[Wdj(P)Wtj(P)]}$$

$$FR0(P) = \frac{\sum_{j=1}^{N0}[Wdj(P)Wtj(P_i)FC_j(P)]}{\sum_{j=1}^{N0}[Wdj(P)Wtj(P)]}$$

where
- $Wd_n$ is a distance weighting coefficient, the formula for which is given below;
- $Wt_n$ is a time weighting coefficient, the formula for which is given below;
- N+ is the total number of times in which the parameter has been increased in the decision record;
- N− is the total number of times in which the parameter has been decreased in the decision record;
- No is the total number of times in which the parameter has not been changed in the decision record; and
- $FC_n$ is the $n^{th}$ cost function for parameter O in the relevant decision record or decision vector.

To calculate the distance weighting factor, one of two methods may be used. The first method is to consider the projecting distance $-Wd_j(P)$ is a projection on parameter of the real space distance between the base setting of the parameter (also known as the base position) and the setting after the perturbation. This can be found by the following formula:

$$Wdj(P) = \frac{1}{[|\overline{P} - Pj|^\varsigma + \beta]}$$

where
- $\overline{P}$ is the base setting of the parameter in the current experiment;
- $P_j$ is the experimental setting of the parameter for the current set.
- Thus, this value is the increased setting if the weighting factor is for the increased setting subset. Alternatively, this is the decreased setting if the weighting factor being calculated is for the decreased setting subset;
- $\varsigma$ is a constant between 2 and 3. This constant may be selected to control the system convergence overshoot;
- $\beta$ is a constant between 1 and 4 $\beta$ can be used to flatten out the weight near to zero (P-$P_j$), while letting th weighting factor roll off quickly as (P-$P_j$) increases. A smaller $\beta$ rejects more experiment noise while a larger $\beta$ averages more Q measurement noise.

The second method for calculating the weighting factor involves defining the $Wd_j(P)$ as the vector distance or as the real space distance between the base setting of P and the experimental setting. This can be found using the formula:

$$Wdj(P) = \frac{1}{[\overrightarrow{BP} - \overrightarrow{PP_j}^{>\varsigma} + \beta]}$$

where
- BP: Base position of the base setting for P
- $PP_j$: the perturbation position of the position after the experimental setting of the parameter and $\overrightarrow{BP} - \overrightarrow{PP_j}$ is given by $$\overrightarrow{BP} - \overrightarrow{PP_j} = \left\{\sum_{k=1}^{Np} 1\overline{P}k - Pk1^\varsigma\right\}^{\frac{1}{2}}$$

$\varsigma$ and $\beta$ are as defined above
- $N_p$=the number of parameter dimensions (how many targeted parameters there are)
- $\overline{P}_k$=the base setting for parameter k for this experiment
- Pk=the experimental setting for parameter k for this specific experiment type (if the experiment is of the increased variety, then Pk is the increased setting but if the experiments is of the decrease variety then Pk is the decreased setting.

The idea behind the distance weighting is to average or low pass filter the measurement and to put more weight on those experiment which have the positions closer to the base settings.

For the time weighting factor, it is an experimental function and can be calculated by the formula:

$$Wtj(P) = e^{\left(\frac{-t}{T}\right)}$$

where
t=time period between the current experiment and the experiment/decision being considered. This time period can be found by $$t = M*Te$$

where Te is the time period or duration per experiment and M is the experiment number from the experiment being considered and the current experiment.

T is a decay constant which may be hours or days. This constant may be adjusted by the system itself during operation.

The time weighting factor weighs down the earlier history results. These earlier results may have an undue effect on the current system behaviour due to the system's slow performance drifting with time.

Once the ratios have been calculated, the decision functions can be found. The decision functions are to be the final basis for deciding whether a parameter is to be increased, decreased or left at its present setting. These decision functions are based on at least a portion of the decision record or the decision vector, the record of the previous decisions taken for that particular parameter. Of course, the depth of the decision record or how far back the decision record goes is dependent on both the system requirement and the resources available to the system.

The decision functions are defined for three cases:

Case 1: Normal $$FD+(P) = FR+(P) + \gamma*[FRo(P) - FR-(P)]$$

$$FD-(P) = FR-(P) + \gamma*[FRo(P) - FR+(P)]$$

$$FDo(P) = FRo(P)$$

Case 2: A positive perturbation of the parameter setting is not found in the decision record period $$FD+(P) = (1+\gamma)*[FRo(P) - FR-(P)]$$

$$FD-(P) = FR-(P)$$

$$FDo(P) = FRo(P)$$

Case 3: A negative perturbation of the parameter setting is not found in the decision record period $$FD+(P) = FR+(P)$$

$$FD-(P) = (1+\gamma)*[FRo(P) - FR+(P)]$$

$$FDo(P) = FRo(P)$$

In all of the above cases, the following definitions apply:
γ is a constant with a value between 0 and 1
FRo (P), FR-(P), and FR+(P) are the ratio function values for parameter P as defined above.

It should be noted that the decision record period is the portion of the decision record used in determining the ratio function. The whole decision record need not be used. Thus, a decision record may contain 100 entries but the period used may only be the most recent 20 decision. As can be seen from the above decision functions, if the period in the decision record is anomalous in that possible changes to the parameter setting are not applied, specific decision functions are calculated differently.

With the decision functions determined, the decision as to the direction of change in the parameter setting can be taken. This decision is based on a comparison of the 3 decision functions:

If FD+(P) is the smallest: Parameter P is increased by one predetermined step.

If FD-(P) is the smallest: parameter P is decreased by one predetermined step.

If FDo(P) is the smallest: parameter P is left at its base setting.

It should be noted that increasing or decreasing or the parameter by one step is simply a matter of resetting the parameter to the relevant experimental setting. This new setting will then become the new base setting for the next experiment. However, setting the parameter to its experimental setting does not necessarily mean duplicating the other experimental settings for the other non-targeted parameters. In the interests of predictability, it may be more useful to leave the non-targeted parameters to its own base settings when implementing the decision concerning the targeted parameters.

It should also be noted that the γ constant used in calculating the decision functions has a specific function. This constant can be used to assist the system in decision making when there is no experiment for a parameter in a certain direction. The choice of a value for this constant can also be used to speed up system convergence or to prevent the system and its optimization from crossing a specific threshold.

Once the decision regarding the change in the parameter setting, this decision is implemented. Once implemented, the new setting becomes the base setting for the next set of experiments.

While the above process may seem circuitous, given that the sorting function, which determines which parameters are to be targeted, seems to be dependent on the decision function that is calculated only in the end, the process is not. The decision function on which the sorting function is based is calculated using the cost function history that does not include the experiment to be performed. Thus, if the current trial is numbered n, the decision function used in determining the sorting function for trial n is calculated on a decision record that only includes trials prior to trial n. Trials n-1, n-2, n-3, . . . n-a, a≦n, may be included in this decision record. From this, the targeted parameters are therefore chosen based on the previous history of trials.

Figure 6:
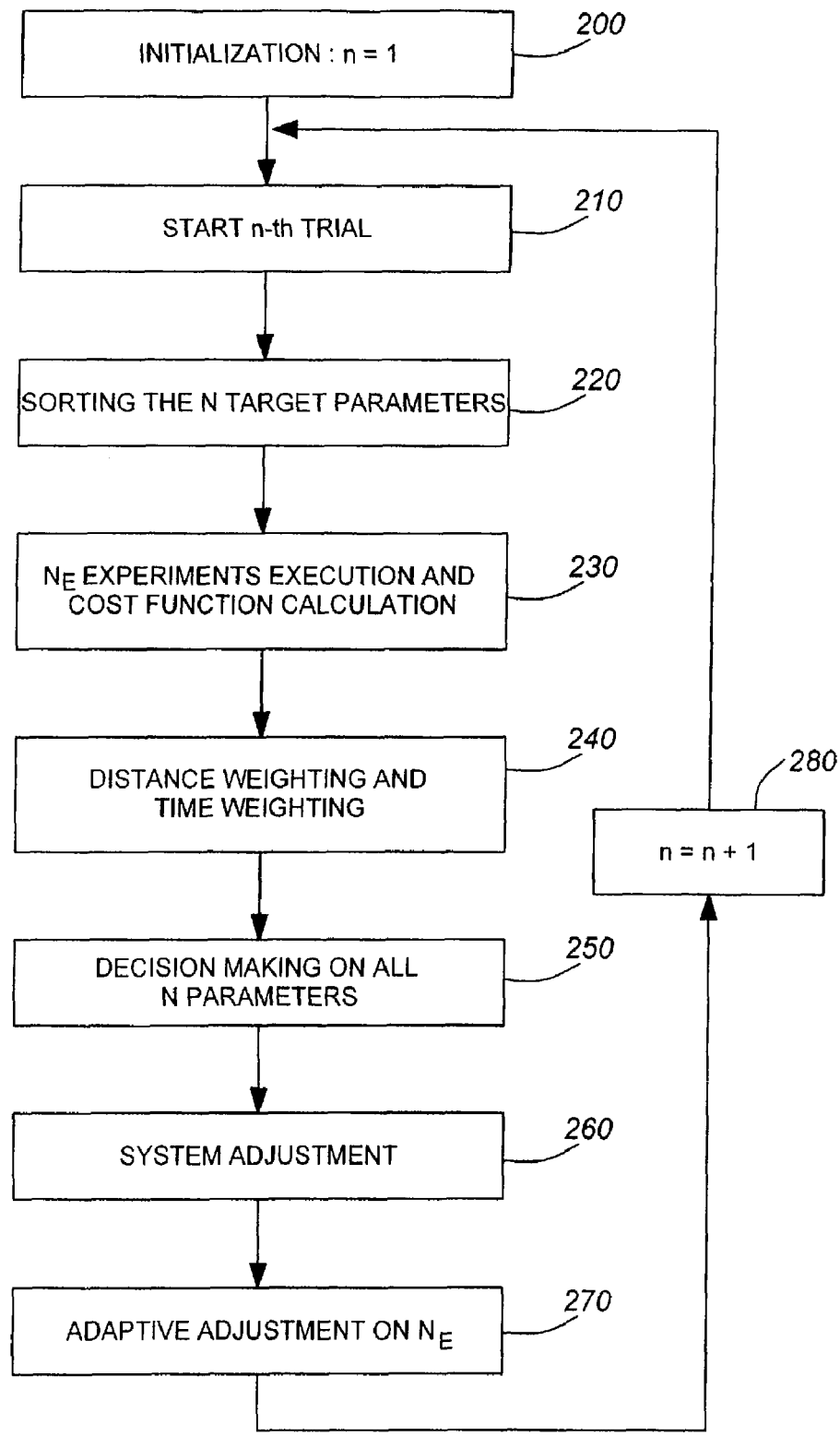
FIG. 6 is a block diagram illustrating the steps in the continuous optimization process according to one aspect of the invention.

The above process for continuous optimization, a so-called steady-state optimization, is summarized in the flowchart of FIG. 6.

Referring to FIG. 6, the process begins at step 200. This step initializes the process and sets a counter n to a value of 1. Step 210 is that of starting trial number n.

Step 220 is that of sorting the multiple controllable target parameters (in this case there are N target parameters) to determine which target parameters are to be examined first. Step 230 is a dual step—that of executing the experiments and then calculating the cost function for each experiment. The calculation of the cost function will be discussed further below. Essentially the cost function reduces to a single value the overall effect on the system by an experiment. Thus, in calculating the cost function for each experiment, the overall effect of that experiment is found, thereby simplifying the comparison between experiments.

Step 240 is that of weighting the cost function results of step 230. This step thus gives different weights to different results. Time weighting gives more weight or effect to recent experiments and less weight or effect to older experiments. Distance weighting puts more weight or effect on experiment results which are closer to the current system setting. Thus, if the current setting for a parameter is Pcurrent and the "distance" between Pcurrent and $P_1$ is greater than the distance between Pcurrent and $P_2$, with $P_1$ and $P_2$ being parameter settings in previous experiments, the experiment results using the setting $P_2$ will be given more weight. The net effect of the weighting is to give more weight or effect in the decision making step (step 250) to experiment results which are not only more recent but whose parameter settings are closer to the system's current setting. Such a step helps in reducing over time the effect of erroneous decisions or improperly set parameters.

Step 260 is of actually implementing the decision of step 250. The global controller thus sends out commands to the system elements with specific settings for specific parameters.

Step 270 adjusts the settings which will be used for the next experiment. Among other things, the database of previous experiment results is to be updated and the starting point for the next experiment is to be adjusted to the current parameter settings based on the decisions made in step 250.

Step 280 increments the counter n and, as can be seen from FIG. 6, the process begins anew with step 210.

While the above optimization procedure uses multiple functions, such as the sorting, ratio, and decision functions, to determine which parameters are to be targeted, an alternative method takes into account parameters which affect multiple channels.

The method outlined below does not use any of the functions discussed above but follows the same concept of experimenting with parameters to optimize the overall system. The parameters for which the method below will apply will be parameters which clearly affect multiple channels. These include all line amplifier parameters, all Raman parameters, multiplexer current, transmit wavelengths, and the 4 channel EDFA (erbium doped fiber amplifier) gain at the demultiplexer. It should be noted that the experimental procedure is the same for this process as for the procedure above. Each parameter is randomly perturbed (increased or decreased) by a set amount and, while at that setting, performance measurements are taken. The measurements are manipulated and, based on a history of previous measurements or decisions, the parameter is increased or decreased.

Essentially, the method determines a ratio for each parameter and, based on that ratio, the parameter is increased or decreased. On a theoretical level, the ratio R(p) for each parameter is found by using the following functions:

$$R(p) = \sum_{i=1}^{Nch} \frac{\text{Weight}(p, ch) Av[CFslope(p, ch)]}{(\ln(aQ_{ch}))^2}$$

with $$\text{Weight}(p, ch) = \frac{|Av[CFslope(p, ch)]|}{\varsigma^2 Qn(p, ch)}$$

and $$Av[CFslope(p, ch)] = \frac{1}{N} \sum_{j=1}^{N} \ln\left(\frac{Qch(p-), j}{Qch(p+), j}\right)$$

and $$\varsigma^2 Qn(p, ch) = \frac{1}{N(N-1)} \sum_{j=1}^{N} \left[\ln\left(\frac{Qch(p-), j}{Qch(p+), j}\right) - Av[CFslope(p, ch)]\right]$$

where
 N is the number of measurements (or experiments)
 Nch is the number of existing channels
 a is an arbitrary parameter currently set at 1
 Qch(p+),j is the measured Q value of channel j when parameter p was increased
 Qch(p−),j is the measured Q value of channel j when parameter p was decreased In terms of implementation, for each trial multiple faired experiments are made. The results of these experiments are then used in the calculations below (calculated recursively during the trial) to result in a final function value at the end of each trial. These functions are derived from the ratio formula for R(p) as outlined above.

The trial functions are:

$$R1(p) = Nch \sum_{ch=1}^{Nch} w1(p, ch) M1(p, ch) c1(ch)$$

where $$M1(p, ch) = \frac{1}{Nm} \sum_{j=1}^{Nm} \ln\left(\frac{Qch(p-), j}{Qch(p+), j}\right)$$

Nm is the number of pairs of experimental results, each pair having one result for an increase in parameter p (p+) and one result for a decrease in parameter p (p−)
 Q ch(p+),j is the Q value for channel ch in experiment j when parameter p was increased
 Q ch(p−), j is the Q value for channel ch in experiment j when the parameter p was decreased $$V1(ch) = \frac{1}{Nm}\left(\ln\left(\frac{Qch(2), j}{Qch(1), j}\right)\right)^2$$

Nm is the number of pairs of experimental results, each pair having one result for an increase in parameter p (p+) and one result for a decrease in parameter p (p−)
 Q ch(2), j is a Q value after experiment j
 Q ch(1),j is the other Q value after experiment j.

$$W1(p, ch) = \frac{Nm|m1(p, ch)|}{V1(ch) - (M1(p, ch))^2}$$

Nm, M1(p,ch), and V1(ch) are as defined above.

$$C1(ch) = \frac{1}{\left(\ln\left(\frac{a}{2Nm}\sum_{i=1}^{2Nm}(Qch(1), j + Qch(2), j)\right)\right)^2}$$

$Qch(1), j$ and $Qch(2), j$ are as defined above and

-continued $$Cf1(p) = \frac{(R1(p))^2}{Nm \sum_{ch=1}^{Nch} \frac{(c1(ch)m1(p, ch))^2}{V1(ch) - (m1(p, ch))^2}}$$

$$CF2(p) = \frac{(R2(p))^2}{NmN2 \sum_{ch=1}^{Nch} \frac{(C2(ch)m2(p, ch)^2}{V2(ch) - (m2(p, ch))^2}}$$

It should be noted that CF1(p) is the estimated signal to noise ratio on the decision and that C1(ch) is the channel weight function.

As can be seen from the above functions, the effect of each parameter perturbation (increase or decrease of the parameter) on each channel is accounted for and included in the calculations. It should be noted that the above functions countenance multiple experiments per parameter. Thus, a parameter P may be increased and decreased multiple times and the results of each increase or decrease is accounted for in the calculations. A parameter P may thus have multiple similar experiments per trial with each pair of experimental results being different from the others. Once the above functions have been computed for a trial, the results for that trial are further manipulated and combined with the results of previous trials to arrive at a decision regarding the direction of change for parameter P.

The results of the trial for parameter P are then combined with the previous results (in a running total fashion) in the functions below:

$$m2(p, ch) = \frac{1}{N2} \sum_{k=1}^{N2} m1(p, ch)k$$

$$V2(ch) = \frac{1}{N2} \sum_{k=1}^{N2} V1(ch)k$$

$$W2(p, ch) = \frac{NmN2|m2(p, ch)|}{v2(ch) - (m2(p, ch))^2}$$

$$C2(ch) = \frac{1}{N2} \sum_{k=1}^{N2} C1(ch)k$$

where

N2 is the number of previous trials included in the calculation. This is not necessarily the total number of trials to date. As an example 100 trials may have been performed to date but only the 10 most recent ones may be included in the calculation. N2 therefore controls the width of a sliding window which determines which trials are to be taken into account.

Nm is the number of experimental result pairs included in a trial.

The final ratio calculation is given by:

$$R2(p) = \sum_{ch=1}^{Nch} w2(p, ch)m2(p, ch)C2(ch)$$

If the result is greater than zero (R(p)>0) then the parameter is to be decreased as the result of the trial, otherwise the parameter is to be increased. The signal to noise ratio of the decision is given by:

From the above trial calculations, it can be seen that the trial/decision history is accounted for in the calculations without the need for maintaining a large database of previous trials and their decisions.

Channel Addition

An added feature of the system is its ability to dynamically add or drop channels to the system without interruption to the other channels. This in-service wavelength addition/deletion (or ISWAD for short) is accomplished by gradually adding or deleting a channel's power from the system. The effects of such added or deleted channels is accounted for in the steady state optimization by similarly gradually adding or deleting their Q to the system cost function. Stability in the system is maintained by setting Q floor thresholds that must be maintained by all the other channels during the addition/deletion. If these thresholds are passed by the existing channels, then the process is aborted. This way, disruption of service is avoided and the convenience of ISWAD is, for that particular instance, sacrificed for service stability and quality.

To add a channel, the process begins with determining if the conditions are right to attempt an addition. A minimum acceptable Q of all the existing wavelength is defined as Q min. This is the lowest Q that a channel may have. If any existing channels have a Q lower than Q min, a channel cannot be added. Experiments have shown that, as a minimum, Q min$\geq$QAddTh. QAddTh is the minimum that Q min should have and a value of QAddTh=4.541, which corresponds to a BER of about $10^{-100}$ (after forward error correction), is suitable.

Once the minimal conditions have been met, the required parameters must be determined. This includes the wavelength of the channel to be added, the transmission power of its neighbouring wavelengths(at its point of entry into the system), and other performance measurements for the neighbouring channels. These parameters can then be used to get the proper parameters for the incoming channel.

With the required data gathered, the local controller, the controller at the point of insertion of addition, is informed of its incoming channel. The multiplexer at this point of insertion is then asked to perform a channel power measurement to determine at what power level the incoming channel is to have. The incoming channel should have a power level that is related to the power levels of the other existing channels. The normal incoming power of the incoming channel should be equal to the average power of all the existing channels as measured in the previous trials. To provide greater emphasis on the neighbouring channels, a neighbouring scheme may be used with the power levels of the neighbouring channels having a greater effect on the average channel power level calculated.

If such a weighting system is used, one method would be to relate the weighting coefficient used on a particular channel to the difference between the centre frequency of that channel and the centre frequency of the incoming channel. Thus, an existing channel with a centre frequency close to the centre frequency of the incoming channel could be given a greater weight and effect than a second existing channel with a centre frequency that is far from that of the incoming channel. A formula as follows can be used:

$$\text{Normal Power of } \lambda_i = \frac{\sum_{j=1}^{n} Pj}{n} = P_{normal}$$

where Pj is the power level of channel j in a system with a channels and $\lambda_i$ denotes the incoming channel.

If a weighting scheme is used, the following equation may be used:

$$\text{Normal Power of } \lambda_i = \frac{\sum_{j=1}^{n} Wpj\, Pj}{n} = P_{normal}$$

where Wpj is the weighting coefficient and its value is determined by the difference between the centre frequency of Pj and the centre frequency of the incoming channel.

When the desired power level of the incoming channel has been determined, the preliminary stage is deemed over. The first stage of the process involves gradually increasing the power of the incoming channel to the desired power level by specific increments. The power of the incoming channel (measured as the multiplexer single channel EDFA output power) is stepped up from zero to Pnormal with a step size of $P_{AddDel}$. The increments can be easily phased in by incrementing the power level at the end of every trial performed for the continuous optimization. While the phasing in of the new channel is gradual and is timed by the optimization trials, it should be noted that the performance of the new channel is not to be taken into account when determining the system's overall performance. Thus, when calculating the cost function, the weighting coefficient $Wc_i$ for the new channel being phased in is zero.

It should be noted that the phasing in of the new channel can be stopped at any time if the overall system performance is impaired or if an existing channel is being detrimentally affected. As noted above, Q min is the minimum value of Q that an existing channel must suppress. Q min must be greater than or equal to QAddTh or the Q threshold needed to initiate and continue with channel addition.

However, $Q_{AddTh} = Q_{ENDLIFE} + Q_{PDL}$

Where $Q_{ENDLIFE}$ is the Q value at the end of life system recommended by a link budget(this can be 3.035)

$Q_{PDL}$ Is dB Q reserved for the worst short term Q degradation due to PDL, PMD (polarization mode dispersion), aging, temperature variation, and even ISWAD itself. $Q_{PDL}$ is recommended as 1.75 dBQ, or 1.51 in linear Q using a base of $Q_{ENDLIFE} = 3.035$. $Q_{PDL}$ is essentially a margin of error or tolerance in the system for unknown factors whose effects cannot be predicted.

From the above, if, at any time during the phasing in of the new channel, any existing channel is determined to have a Q lower then the predefined QAddTh, then the phasing in or addition is aborted.

Another possible reason for aborting the channel addition is if the phasing in of the new channel is not proceeding properly. As noted above, the power level of the incoming channel is increased from zero to Pnormal in discrete steps. This gradual power level increase, however, cannot proceed indefinitely. A set period of time, Timer $\text{Add}_1$, is specifically allotted for this part of the procedure. If a power level of Pnormal has not been achieved in the set period, the weak channel must be fixed by other means such as human intervention. Alternatively, and this holds true as well for any aborted channel addition, a different wavelength or channel can be chosen for addition to the system. Thus, any problems in channel addition can lead to either human intervention (alerted through some alarm system triggered by anomalous circumstances such as the incoming channels inability to achieve acceptable power levels in a given time period) or a new attempt at adding a different and, hopefully less troublesome channel.

With the incremental increase of the incoming channel's power level proceeding space, the required equipment settings for this channel must be set. The transmit laser wavelength, the transmit device level of the pulse generator, and the device level of the DGFF (Dynamic Gain Flattering Filter) pixel must all be set at their default values. The output power of the demultiplexer EDFA, for this channel, must be set at the average settings for its neighbouring channels. Thus, if an incoming channel i has 6 neighbouring channels i−3, i−2, i−1 on one side and i+1, i+2, i+3 on the other, the parameter settings for all these channels are to be found and averaged to arrive at the parameter settings for new channel i. If, on the other hand, the channel i has no neighbour, then the parameter settings are to be left at their default settings. As noted above, a first channels' neighbour is defined as a second channel whose centre frequency is close in value to the first channels' centre frequency.

For the incoming channels' DDCM setting, the recommended setting for SLAT,(system lineup and test) is to be used. If there is no recommended setting for SLAT, then the dispersion measurement must be handle and the DDCM is set as the SLAT.

This first stage of the channel addition process is considered over when the Q value for the incoming channel is at least equal to the Q setting for SLAT.

The second stage of the channel addition process involves fine tuning the incoming channel to bring its performance to the level of the existing channels. To accomplish this, the contribution of the incoming channel to the cost function is gradually increased until the Q value for the incoming channel is fully integrated into the cost function calculation. As explained above, the cost function formula is as follows:

$$FC = \sum_{i=1}^{Nc} Wc_i (\Delta Qi)^{\alpha}$$

where $$\Delta Q = \begin{cases} (Qth - Qi), & \text{if } Qi < Qth \\ 0, & \text{if } Qi \geq Qth \end{cases}$$

Nc=number of channels in the system
$Wc_i$=channel weighting coefficient for channel i
Qth=Q threshold value
$Q_i$=Q value for channel i
$\alpha$=adjustable power factor The gradual increase in contribution of the incoming channels' Q value to the cost function is effected by increasing its Wc or channel weighting coefficient from 0 to 1 by fixed increments. Thus, for incoming channel i, its channel weighting coefficient is given by $Wc_i = Wc_i + \Delta Wc$ where $\Delta Wc$ is a fixed value.

The increments are applied to the weighting coefficient on a trial based rate. This means that, initially, $Wc_i$ has a value of 0 and at every trial its value is increased by $\Delta Wc$. Thus, at the $5^{th}$ trial after the incoming channel is introduced, $Wc_i$ will have a value of $5\Delta Wc$. This continues until $Wc_i$ has a value of 1.

It should be noted that the gradual introduction of the incoming channel's Q will be halted if something untoward occurs. One possible occurrence is the degradation of an existing channel's Q value. Each existing channel's Q value is maintained and if a channel's Q value drops below a specified threshold (such as $Q_{ENDLIFE}$) then the increase in the incoming channel's $Wc_i$ value stops. While the drop in an existing channel's Q value may not be due to the introduction of the incoming channel, this may be a contributing factor.

In addition to the gradual increase in the incoming channels' $Wc_i$ value, its parameters are not to be included in the optimization experiments until $Wc_i=1$. In other words, its parameters are not to be included until the incoming channel's Q value is a fully functional and contributing to the cost function. Also, the parameters for the incoming channel are not to be included in the sorting, processing, or decision making functions until the second stage of the channel addition process.

Furthermore, the Q value for the incoming channel is not to included in the determination of the lowest Q value in the system until the Q value for the incoming channel is greater than or equal to $Q_{Addth}$. This second stage of the channel addition process will be considered over when the incoming channel's channel weighting coefficient ($Wc_i$) equals 1 and when the incoming channel's Q value is at least equal to $Q_{Adddth}$. In other words, the second stage is declared over when the incoming channel fully contributes to the cost function and when the incoming channel passes the $Q_{Addth}$ level.

Similar to the first stage of the channel addition process, if the requirements of the second stage are not fulfilled in a set amount of time, an alarm is triggered and extraordinary measures need to be taken. Thus, if stage 2 is not complete after a specific period Timer$_{Add2}$ or due to an abortion of the procedure, human intervention to fix the weak incoming channel is required. Alternatively, a new channel may be chosen for the next channel addition if the second stage is still incomplete.

Once the second stage in the addition process is finished, the incoming channel becomes an existing channel and its parameters and Q value become available to all the calculations and functions utilized in the continuous optimization.

Figure 7:
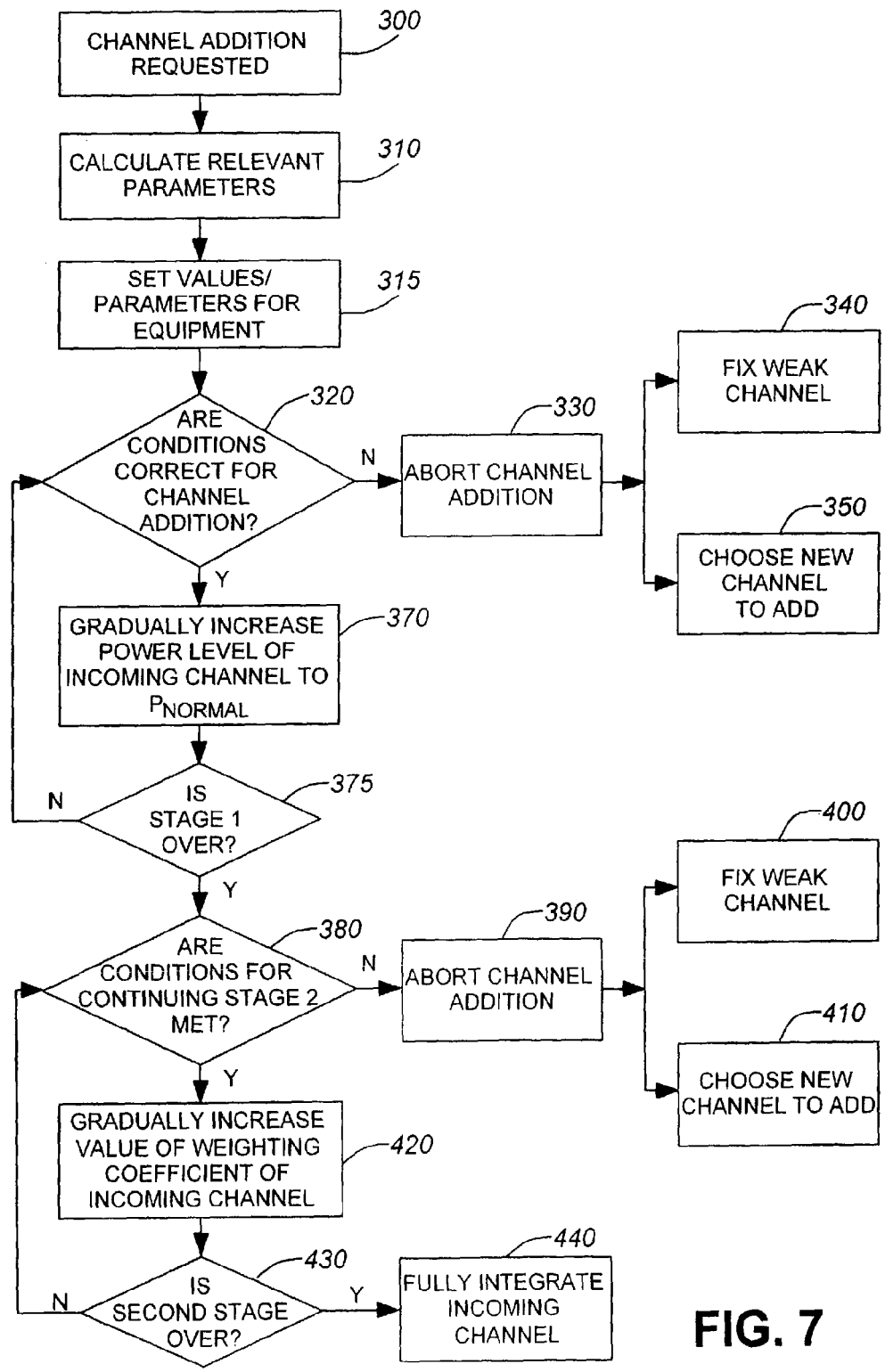
FIG. 7 is a flowchart detailing the steps in the channel addition process.

To summarize the steps in the channel addition process, FIG. 7 is a flowchart detailing these various steps and their steps. Step 300 is that of first requesting that a channel be added. This request is made to system controller and it initiates the rest of the process. Step 310 is that of determining the required parameters for the incoming channel. This includes the power level it should have at the end of the process and, as noted above, this power level is based on the power level of the other channels. Step 315 is to set the proper parameters for the devices being used. This includes setting the proper wavelength for the transit laser and the proper output power setting for the demultiplexer. After this, step 320 tests to determine if the conditions are acceptable for a channel addition. This test may involve testing if the Q values for all existing channels are above a predetermined threshold. If this test is not passed, then step 330 aborts the channel addition process and either a new channel is chosen to be added (step 350) or the weak incoming channel can be fixed (step 340).

If the above noted test is passed, the incoming channel is introduced into the system and its power level gradually increased (step 370). The first stage of the process (comprising steps 315 to 370) is declared complete when the Q value for the incoming channel achieves, as a minimum, a specific threshold. Step 375 tests for this threshold and if it is not met, steps 320-370 are repeated.

Once the first stage is over, the second stage of the process begins. Step 380 is of determining if the conditions are correct to initiate or continue the second stage. If the conditions are not correct, then step 390 aborts the channel addition process. Once the channel addition process in aborted, either the weak incoming channel is fixed by human interventions (step 400) or a new channel is chosen to be added. If, on the other hand, the stage 2 conditions are correct, then the incoming channel is gradually introduced into the cost function. After every increased in the weighting coefficient, step 430 checks if the conditions dictate an end to the second stage. If the conditions still call for a continuation of the second stage, then steps 380-430 are repeated. If the second stage is declared over, then step 440 notes that the incoming channel is now fully integrated into the system.

It should be noted that the above process can be repeated to add further channels to the system.

Channel Deletion

For in service & channel or wavelength deletion, the system provides this function by gradually decreasing the outgoing channel's power level and its contribution to the overall system performance.

The first of two stages for channel deletion steadily decreases the outgoing channel's contribution to the cost function. During this stage, the parameters of the outgoing channel are removed from the sorting, processing, and decision functions. Then, the weighting coefficient associated with the outgoing channel's Q value in the cost function, $Wc_i$, is decreased by a set amount. This decrease is gradually effected with each trial in the optimization process causing a decrease in the coefficient. Thus, if the initial value of the coefficient is $Wc_x$ and the quantum of the decrease is $\Delta Wc_i$, then after 5 trials, the value of $Wc_i$ is $Wc_x-5\Delta Wc_i$. Mathematically, this relation can be expressed as:

$$Wc_{i(x)} = Wci_{(x-1)} - Wc$$

where $Wc_{i(x)}$ is the weighting coefficient at trial x $Wc_{(x-1)}$ is the weighting coefficient at trial (x-1), and $\Delta Wc$ is the predetermined decrease value for the coefficient.

The coefficient is therefore decreased from its normal value, usually 1, to zero.

While the above is occurring, the rest of the existing channels are maintained at their previous performance levels. The Q value for each of these channels is not to drop by more than $Q_{PDL}$ from its value prior to the channel deletion process. As noted above, $Q_{PDL}$ is dB Q reserved for the worst short term Q degradation due PDL, PMD, aging, temperature variation or channel addition/deletion. In short, $Q_{PDL}$ is the tolerance allowed for the Q valves. If a Q value for an existing channel does decrease by more then $Q_{PDL}$, then the decrease in the outgoing channels' weighting coefficient is either slowed down or halted.

Furthermore, as noted above, the outgoing channels' parameters are removed from consideration for all optimization tests, calculations, or functions. Not only that, but the Q value for the outgoing channel is also removed from any consideration relating to system optimization. After the weighting coefficient for the outgoing channel reaches zero, the first stage is determined to be over.

The second stage of the deletion process involves decreasing the power level of the outgoing signal. This is done by gradually decreasing the outgoing channel's power level by a set value at every trial until the power level equals zero and its Q value is, at most, equal to $Q_{ENDLIFE}$. Thus, for every trial subsequent to the first stage of the channel deletion process, the outgoing channels' power level is decreased by $P_{AddDel}$ units until the power level equals zero. Again, the same conditions that applied to the existing channels in the first stage of the channel deletion process applies as well during the second stage. If an existing channels' Q value drops by more than $Q_{PDL}$, then the power level decrease is halted or slowed down.

Figure 8:
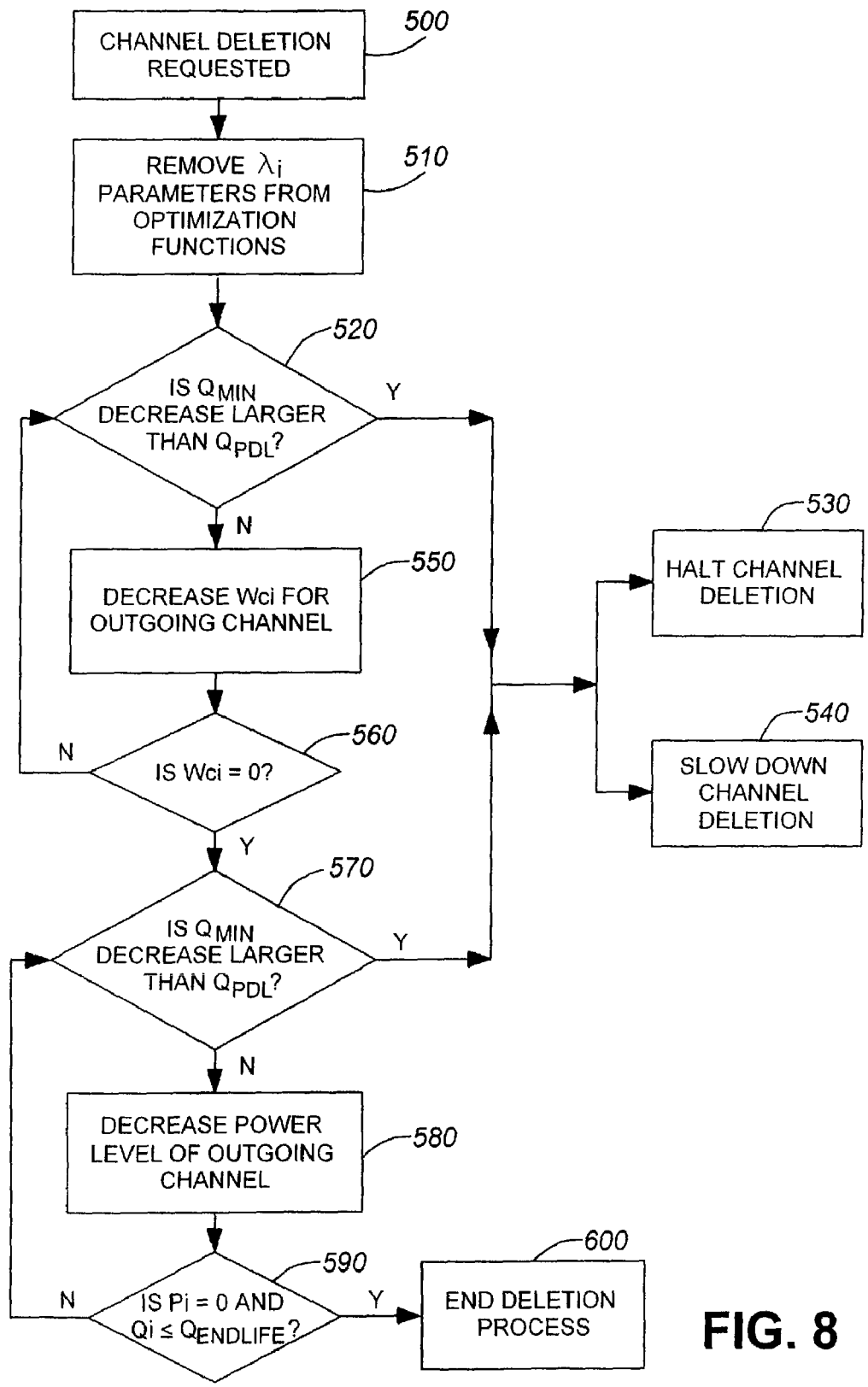
FIG. 8 is a flowchart detailing the steps in the channel deletion process.

To summarize the steps involved in the channel detection process, FIG. 8 is a flowchart detailing these steps. As can be seen, the initial step is to request a channel deletion (step 500). This request is received by the controller and it initiates the rest of the sequence. Step 510 is to remove the outgoing channel's parameters from all the optimization functions, decisions, and calculations. This can be done by either entering a zero coefficient for the relevant parameter or by merely removing the parameter from the relevant vector. Step 520 checks to determine if conditions allow for a continuation of the channel deletion. This condition, that the lowest Q value of the existing channels does not decrease more than a set amount, ensures that the channel deletion is not causing undue detrimental effects on the system or, at the very least, that any detrimental effects are not attributable to the channel deletion. If the condition in step 520 is not met, that the lowest Q value of the existing channels has dropped by more than the allotted amount, then either of steps 530 or 530 is executed. Step 530 halts the channels deletion process while step 540 slows the process down, perhaps by changing the amount by which the relevant setting or coefficient is decreased.

To continue the process, if step 520 is answered in the negative, then step 550 is to decrease the weighting coefficient in the cost function related to the Q value for the outgoing channel. This step steadily diminishes the contribution that the outgoing channel's Q value makes to the overall cost function. As noted above, instances of this decrease only occurs after an experiment or a trial. Furthermore, and again as noted above, the amount of decrease is predetermined.

After the coefficient $Wc_i$ is decreased, then step 560 checks if the exit condition to the first stage (comprising steps 520-560) is met. This condition is that the coefficient decreased in step 550 be equal to zero. Once this is met, the Q value for the outgoing channel is no longer contributing to the system's cost function. If the condition is not met, then steps 520-560 (stage 1) is repeated until the condition is met.

If the condition noted above is met, then stage two of the deletion process begins. Step 570 again checks if the condition for continuing with the deletion process is met. This condition, and its consequences if it is not met, is identical to those of the fist stage. If the lowest Q value for an existing channel in the system decreases by an amount larger than a predetermined amount, then either the channel deletion process is halted (step 530) or the process is slowed down by decreasing the amount by which the outgoing channel's power level is diminished (step 540).

The next step (step 580), if the condition for continuing the deletion process is met, is to actually lower the outgoing channel's power level by a set amount. Much like in stage one, every instance of this step is executed only after an optimization trial. Step 530, after decreasing the power level of the outgoing channel, is to determine if the exit conditions for stage two are met. These conditions are that the power level of the outgoing channel equals zero and that its Q value is, at most, a certain value.

If the exit conditions are not met, then the second stage (steps 570-590) is repeated until the exit conditions are met. The final step, step 600, ends the deletion process.

Much like the channel addition process, the channel deletion process can be repeated to delete more than one channel.

It should be noted for clarity that the above channel addition/deletion processes does not relate to dynamic addition/deletion of specific channels as found in optical add/drop multiplexers. Add/drop in this document refers to adding and deleting or decreasing transmission capacity in the system and not specific transmission links. Thus, if the system is operating with ten 10 Gbit transmission trunks, any one of these trunks can be activated or deactivated to expand or contract the transmission capacity of the system. To further clarify the above, adding a channel, as the term is used above, is identical to activating a pre-existing trunk while deleting a channel, as the term is used above, is identical to deactivating a pre-existing trunk.

The above system is particularly suited for controlling optical components from a remote location. Optical devices such as DCFFs (dynamic gain flattening filters) can be located at location A while the controller can be located in location B. The controller can then adjust the settings and the performance of the DGFF at location A.

A person understanding the above-described invention may now conceive of alternative designs, using the principles described herein. All such designs which fall within the scope of the claims appended hereto are considered to be part of the present invention.

What is claimed is:

1. A method of activating additional transmission capacity in an optical communications system, said additional capacity comprising at least one incoming optical channel, said method comprising:
   a) determining if operating conditions in said communications system are conducive to an addition of an incoming optical channel;
   b) if operating conditions are conducive to a channel addition, determining a desired power level of the incoming channel and gradually increasing the power level of said incoming channel until the power level of the incoming optical channel equals the desired power level; and
   c) if operating conditions continue to be conducive to a channel addition, subsequently fine tuning performance of the incoming channel by gradually increasing a channel weighting coefficient associated with said incoming optical channel in a cost function of the optical communication system, the cost function being used for continuous performance optimization of the optical communication system.

2. A method as in claim 1 wherein said weighting coefficient is incrementally increased by a predetermined amount during each of a plurality of steps.

3. A method as in claim 1, wherein step (b) further comprises optimizing the communications system while said power level is being increased by randomly adjusting parameters of said communications system to determine which change in parameters will increase a system performance value, said system performance value being based on performance values of existing channels in said communication system.

4. A method as in claim 3, further comprising calculating a sorting function for each parameter prior to selecting which parameters are to be adjusted.

5. A method as in claim 1, wherein the power level of said incoming channel is incrementally increased by a predetermined amount during each of a plurality of steps.

6. A method as in claim 1, wherein the desired power level of the incoming channel is an average power level of existing optical channels in the optical communications system.

7. A method as in claim 6, wherein the average is a weighted average, such that existing optical channels nearest the incoming optical channel have a greater weight than other existing optical channels.

8. A method as in claim 1, further comprising aborting addition of the incoming channel if, in step (b), a performance measurement of the incoming channel fails to at least equal a first predetermined threshold.

9. A method as in claim 8, wherein the first pre-determined threshold is a default setting for System Lay-up And Test (SLAT).

10. A method as in claim 1, further comprising aborting addition of the incoming channel if, in step (c), a performance measurement of the incoming channel fails to at least equal a second predetermined threshold.

11. A method as in claim 10, wherein the second pre-determined threshold is based on link budget.

12. A method as in claim 1, further comprising aborting addition of the incoming channel if, in either of step (b) or step (c), a respective performance measurement of an existing channel in the optical communications system degrades below a predetermined threshold.

13. An article of manufacture comprising:
computer readable media containing computer readable and executable code comprising instructions for a method of activating additional transmission capacity in a optical communications system, said additional capacity comprising at least one incoming optical channel, said method comprising:
a) determining if operating conditions in said communications system are conducive to an addition of an incoming optical channel;
b) if operating conditions are conducive to a channel addition, determining a desired power level of the incoming channel and gradually increasing the power level of said incoming channel until the power level equals the desired power level; and
c) if operating conditions continue to be conducive to a channel addition, subsequently fine tuning performance of the incoming channel by gradually increasing a channel weighting coefficient associated with said incoming optical channel in a cost function of the optical communication system, the cost function being used for continuous performance optimization of the optical communication system.

* * * * *